United States Patent
You et al.

(10) Patent No.: US 9,813,349 B2
(45) Date of Patent: Nov. 7, 2017

(54) TRANSMISSION PATH AND DATA PROCESSING METHOD FOR TRANSMISSION PATH

(71) Applicant: Huawei Technologies Co., Ltd., Shenzhen (CN)

(72) Inventors: Yong You, Shenzhen (CN); Xiyou Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 224 days.

(21) Appl. No.: 14/736,743

(22) Filed: Jun. 11, 2015

(65) Prior Publication Data

US 2015/0365332 A1   Dec. 17, 2015

(30) Foreign Application Priority Data

Jun. 13, 2014 (CN) .......................... 2014 1 0265683

(51) Int. Cl.
*H04L 12/26* (2006.01)
*G06F 9/46* (2006.01)
(Continued)

(52) U.S. Cl.
CPC .............. *H04L 47/30* (2013.01); *H04L 47/26* (2013.01); *H04L 47/263* (2013.01); *H04L 47/36* (2013.01)

(58) Field of Classification Search
CPC ... H04L 12/805; H04L 12/835; H04L 12/825; H04L 47/36; H04L 12/26; H04L 47/30;
(Continued)

(56) References Cited

U.S. PATENT DOCUMENTS 6,405,258 B1  6/2002  Erimli et al.
8,037,213 B2 * 10/2011  Archer .................... G06F 13/28
                                                      370/389
(Continued)

FOREIGN PATENT DOCUMENTS

CN       1488105 A      4/2004
CN     101013935 A      8/2007
(Continued)

*Primary Examiner* — Edan Orgad
*Assistant Examiner* — Vanneilian Lalchinthang
(74) *Attorney, Agent, or Firm* — Leydig, Voit & Mayer, Ltd.

(57) ABSTRACT

The present invention provide a transmission path, including: an FD storage module, configured to receive and store an FD; a calculating module, configured to determine, according to a length value of the first frame stored in the FD storage module, a volume of data stored in the transmission path; a determining module, configured to determine whether the volume of the data stored in the transmission path determined by the calculating module is greater than a preset data volume threshold; and an instructing module, configured to send a backpressure signal to the TM module when the determining module determines that the volume of the data stored in the transmission path is greater than the preset data volume threshold, where the backpressure signal is used to instruct the TM module to stop sending an FD of the second frame to the transmission path.

8 Claims, 4 Drawing Sheets

(51) Int. Cl.
*H04L 12/835* (2013.01)
*H04L 12/825* (2013.01)
*H04L 12/805* (2013.01)

(58) Field of Classification Search
CPC ......... H04L 47/26; H04L 47/263; G06F 9/46; Y02B 60/162
USPC ........................................................ 370/236
See application file for complete search history.

(56) References Cited

U.S. PATENT DOCUMENTS

| | | | | |
|---|---|---|---|---|
| 8,737,417 | B2* | 5/2014 | Khawer | H04L 49/9031 370/428 |
| 2004/0057380 | A1* | 3/2004 | Biran | G06F 13/4022 370/235 |
| 2006/0092837 | A1* | 5/2006 | Kwan | H04L 47/10 370/229 |
| 2006/0265517 | A1* | 11/2006 | Hashimoto | H04L 69/16 709/245 |
| 2007/0133582 | A1 | 6/2007 | Banerjee et al. | |
| 2008/0212472 | A1* | 9/2008 | Musacchio | H04Q 3/68 370/232 |
| 2009/0180380 | A1 | 7/2009 | Prabhakar et al. | |
| 2013/0125127 | A1* | 5/2013 | Mital | G06F 9/46 718/102 |
| 2013/0155858 | A1* | 6/2013 | Chen | H04L 47/10 370/235 |
| 2014/0347997 | A1* | 11/2014 | Bergamasco | H04L 47/10 370/236 |

FOREIGN PATENT DOCUMENTS

| | | |
|---|---|---|
| CN | 101984594 A | 3/2011 |
| CN | 104052676 A | 9/2014 |

* cited by examiner

<Prior Art>

TRANSMISSION PATH AND DATA PROCESSING METHOD FOR TRANSMISSION PATH

CROSS-REFERENCE TO RELATED APPLICATION

This application claims priority to Chinese Patent Application No. 201410265683.3, filed on Jun. 13, 2014, which is hereby incorporated by reference in its entirety.

TECHNICAL FIELD

The present invention relates to the field of network device technologies, and in particular, to a transmission path and a data processing method for a transmission path.

BACKGROUND

The Transmission Control Protocol (Transmission Control Protocol, TCP) is a communications protocol specifically designed for providing a reliable end-to-end communications service on the unreliable Internet. When a packet is transmitted based on the TCP protocol, generally, an action of sending the packet by a transmit end is triggered by a TCP acknowledgment (Acknowledgment, ACK) frame that is received from a receive end, and if the ACK frame sent from the receive end is not received, the packet generally is not sent (except for a case of retransmission upon timeout). For some TCP-based applications, such as File Transfer Protocol (File Transfer Protocol, FTP) downloading, if an ACK frame that is sent by a client to a server end is blocked in a network transmission process, latency by which the ACK frame arrives at the server end increases, and a time by which the server end waits to start a next packet transmission increases accordingly; as a result, FTP downloading efficiency decreases. Reasons for ACK frame transmit latency generated inside the transmit end are analyzed below.

In a common network device, an ACK frame and a packet including normal service data are both sent to a link by a same transmission path of a first input first output (First Input First Output, FIFO) structure. It can be known from FIG. 1 that, a transmission path (Tx_path) mainly includes a frame descriptor first input first output (FD_FIFO) unit, a transmit processing (Tx_Pres) unit, a transmit buffer (TxBuffer) unit, and the like. An upper-level traffic management (Traffic Management, TM) module schedules and outputs a frame descriptor (Frame Descriptor, FD) to the transmission path, where the FD records information such as a buffer address and a frame length of a frame. Scheduling of the TM has certain burst and latency. In order to absorb the burst and latency, and adapt to processing of the Tx_Pres unit, FD_FIFO is designed to store the FD. The Tx_Pres reads corresponding packet data from a packet buffer (Packet Buffer) according to buffer address information of the frame that is recorded in the FD. The packet buffer is a memory, and may specifically be a shared random access memory (Random Access Memory, RAM). The packet data read from the packet buffer is first buffered in the TxBuffer. Transmission is started only when there is an entire frame in the TxBuffer or a volume of buffered data reaches a set byte transmit threshold, which can avoid long packet cutoff.

It can be known from the foregoing structure analysis of the transmission path that, the FD_FIFO buffers the FD, the TxBuffer buffers the packet, and the buffered data constitutes a queue head of an FD that newly enters the transmission path. A packet corresponding to the FD that newly enters the transmission path can be sent only after all packets in the queue head have been sent. As shown in FIG. 1, a packet a represents the FD that newly enters the transmission path. There are several packets d that wait to be sent before a, and the packet a is an ACK frame with a high priority. If there are many long packets among the packets d ranked before the packet a, although it can be ensured, by means of strict priority scheduling in the TM, that the TM first schedules the ACK frame with a high priority to enter the transmission path in a case in which there is no backpressure signal, there are multiple long packets that wait to be sent before the ACK frame, very large blocking latency is generated for the ACK frame; if there are many short packets among the packets ranked before the packet a, blocking latency is relatively small. In addition, because a quantity of packets that can be buffered in the transmission path is limited, when the FD_FIFO in the transmission path is filled with packets, the TM receives a backpressure signal of the transmission path and cannot schedule data to enter the transmission path until the transmission path completes sending of a packet to the link and cancels the backpressure signal for the TM. In this case, the blocking latency for the ACK frame becomes larger.

Based on the foregoing analysis, it can be known that because there may be many long packets buffered in the transmission path, that is, a volume of data stored in the transmission path may be very large, all packets including the ACK frame may be subject to large blocking latency in the transmission path. However, in the prior art, a solution that can effectively control the volume of the data stored in the transmission path to control the blocking latency for the packets in the transmission path has not been put forward.

SUMMARY

Embodiments of the present invention provide a transmission path and a data processing method for a transmission path, which are used to control a volume of data stored in the transmission path, so as to control blocking latency for a packet.

According to a first aspect, an embodiment of the present invention provides a transmission path, including:

a frame descriptor FD storage module, configured to receive and store a frame descriptor FD, sent by a traffic management TM module, of the first frame, where the FD of the first frame includes a length value of the first frame;

a calculating module, configured to determine, according to the length value of the first frame stored in the FD storage module, a volume of data stored in the transmission path, where the volume of the data stored in the transmission path includes a data volume of a frame corresponding to a stored FD and a data volume of a stored frame;

a determining module, configured to determine whether the volume of the data stored in the transmission path determined by the calculating module is greater than a preset data volume threshold; and an instructing module, configured to send a backpressure signal to the TM module when the determining module determines that the volume of the data stored in the transmission path is greater than the preset data volume threshold, where the backpressure signal is used to instruct the TM module to stop sending an FD of the second frame to the transmission path.

With reference to the first aspect, in a first possible implementation manner, the calculating module is specifically configured to:

determine the sum of a volume of data stored in the transmission path before the FD storage module stores the FD of the first frame and the length value of the first frame stored in the FD storage module, as the volume of the data stored in the transmission path.

With reference to the first aspect or the first possible implementation manner of the first aspect, in a second possible implementation manner, the transmission path further includes:

a sending module, configured to send first data to a link, where the first data is data of a frame stored in the transmission path, where the calculating module is further configured to subtract a data volume of the first data from the volume of the data stored in the transmission path, so as to update the volume of the data stored in the transmission path.

With reference to the first aspect, or the first or the second possible implementation manner of the first aspect, in a third possible implementation manner, the calculating module is further configured to determine a quantity of FDs stored in the FD storage module;

the determining module is further configured to determine whether the quantity of FDs determined by the calculating module reaches a preset quantity threshold; and the instructing module sends the backpressure signal to the TM module when the determining module determines that the quantity of FDs determined by the calculating module reaches the preset quantity threshold.

With reference to the first aspect, or any one of the first to the third possible implementation manners of the first aspect, in a fourth possible implementation manner, the FD of the first frame further includes a start storage address, in a memory, of the first frame, and the transmission path further includes:

a frame storage module, configured to obtain the first frame from the memory according to the length value of the first frame stored in the FD storage module and the start storage address of the first frame, and store the first frame.

According to a second aspect, an embodiment of the present invention provides a data processing method for a transmission path, including:

receiving and storing, by the transmission path, a frame descriptor FD, sent by a traffic management TM module, of the first frame, where the FD of the first frame includes a length value of the first frame;

determining, by the transmission path according to the length value of the first frame, a volume of data stored in the transmission path, where the volume of the data stored in the transmission path includes a data volume of a frame corresponding to a stored FD and a data volume of a stored frame;

determining, by the transmission path, whether the volume of the data stored in the transmission path is greater than a preset data volume threshold; and sending, by the transmission path, a backpressure signal to the TM module when the volume of the data stored in the transmission path is greater than the preset data volume threshold, where the backpressure signal is used to instruct the TM module to stop sending an FD of the second frame to the transmission path.

With reference to the second aspect, in a first possible implementation manner, the determining, by the transmission path according to the length value of the first frame, a volume of data stored in the transmission path includes:

determining, by the transmission path, the sum of a volume of data stored before the FD of the first frame is stored and the length value of the first frame, as the volume of the data stored in the transmission path.

With reference to the second aspect, or the first possible implementation manner of the second aspect, in a second possible implementation manner, the method further includes:

sending, by the transmission path, first data to a link, where the first data is data of a frame stored in the transmission path; and subtracting, by the transmission path, a data volume of the first data from the volume of the data stored in the transmission path, so as to update the volume of the data stored in the transmission path.

With reference to the second aspect, or the first or the second possible implementation manner of the second aspect, in a third possible implementation manner, the method further includes:

determining, by the transmission path, a quantity of FDs stored in the transmission path; and sending, by the transmission path, the backpressure signal to the TM module when it is determined that the quantity of the stored FDs reaches a preset quantity threshold.

With reference to the second aspect, or any one of the first to the third possible implementation manners of the second aspect, in a fourth possible implementation manner, the FD of the first frame further includes a start storage address, in a memory, of the first frame, and the method further includes:

obtaining, by the transmission path, the first frame from the memory according to the length value of the first frame and the start storage address of the first frame, and storing the first frame.

In the embodiments of the present invention, when a volume of data stored in a transmission path is greater than a preset data volume threshold, the transmission path sends a backpressure signal to a TM module, so that the volume of the data stored in the transmission path is controlled within a certain range, and accordingly, blocking latency for a packet that newly enters the transmission path is also controlled.

DESCRIPTION OF EMBODIMENTS

Embodiments of the present invention provide a transmission path and a data processing method for a transmission path, which are used to control blocking latency for a packet in the transmission path and avoid a case of an excessively high blocking latency for the packet.

After a TM module sends an FD of the first frame to a transmission path module, a transmission path stores the FD of the first frame in an FD queue; the transmission path does not extract the FD of the first frame until the FD of the first frame enters a position at a queue head, obtains the first frame from a memory according to information of the extracted FD, and stores the first frame to a frame queue; and finally the transmission path sends frames in sequence according to an order of the frame queue. In this embodiment of the present invention, a volume of data stored in the transmission path refers to the sum of data volumes of frames to be sent by the transmission path. Because the transmission path stores both an FD and a frame, and the FD is used to obtain a corresponding frame and send the frame, the volume of the data stored in the transmission path includes a data volume of a frame corresponding to the stored FD and a data volume of the stored frame.

Figure 2:
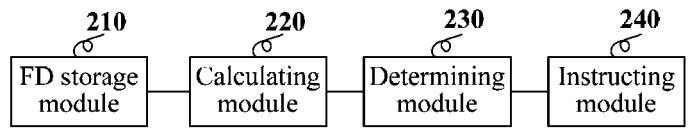
FIG. 2 is a schematic structural diagram of a transmission path according to an embodiment of the present invention.

Referring to FIG. 2, a transmission path provided by an embodiment of the present invention includes:

an FD storage module 210, configured to receive and store an FD, sent by a traffic management TM module, of the first frame, where the FD of the first frame includes a length value of the first frame;

a calculating module 220, configured to determine, according to the length value of the first frame stored in the FD storage module, a volume of data stored in the transmission path, where the volume of the data stored in the transmission path includes a data volume of a frame corresponding to a stored FD and a data volume of a stored frame;

a determining module 230, configured to determine whether the volume of the data stored in the transmission path determined by the calculating module is greater than a preset data volume threshold; and an instructing module 240, configured to send a backpressure signal to the TM module when the determining module determines that the volume of the data stored in the transmission path is greater than the preset data volume threshold, where the backpressure signal is used to instruct the TM module to stop sending an FD of the second frame to the transmission path.

The calculating module 220 is specifically configured to:

determine the sum of a volume of data stored in the transmission path before the FD storage module stores the FD of the first frame and the length value of the first frame stored in the FD storage module, as the volume of the data stored in the transmission path.

Optionally, the calculating module is further configured to determine a quantity of FDs stored in the FD storage module;

the determining module is further configured to determine whether the quantity of FDs determined by the calculating module reaches a preset quantity threshold; and the instructing module sends the backpressure signal to the TM module when the determining module determines that the quantity of FDs determined by the calculating module reaches the preset quantity threshold.

FDs are stored in the transmission path one by one. A quantity of FDs that can be stored in the transmission path is limited. When the quantity of FDs stored in the transmission path reaches a maximum storage quantity, the backpressure signal is sent to the TM module. In this embodiment of the present invention, a quantity of FDs currently stored in the transmission path is monitored, and when the quantity of FDs reaches the preset quantity threshold, the backpressure signal is sent to the TM module. The quantity threshold may be set to any value that is not greater than the maximum storage quantity, so as to achieve an objective of controlling data processing for the transmission path more flexibly. It should be noted that, although blocking latency can be reduced by limiting a quantity of FDs allowed to enter the transmission path to a relatively small value, anti-burst performance of the transmission path is affected to a certain degree, that is, when packets corresponding to multiple consecutive FDs are all short packets, it may be caused that a speed at which the transmission path sends a packet to a network is greater than a scheduling speed of the TM, and working efficiency of the transmission path is reduced.

Optionally, the FD of the first frame further includes a start storage address, in a memory, of the first frame, and the transmission path further includes:

a frame storage module, configured to obtain the first frame from the memory according to the length value of the first frame stored in the FD storage module and the start storage address of the first frame, and store the first frame.

Optionally, the transmission path further includes:

a sending module, configured to send first data to a link, where the first data is data of a frame stored in the transmission path, where the calculating module is further configured to subtract a data volume of the first data from the volume of the data stored in the transmission path, so as to update the volume of the data stored in the transmission path.

That is, the transmission path keeps recording a volume of data stored currently, increases the recorded data volume when an FD enters the transmission path, and reduces the recorded data volume when a packet is sent, so as to ensure correctness of the volume of the stored data that is recorded by the transmission path.

Further, the first data sent by the sending module is data of 2 bytes or 16 bytes in a frame at a queue head in the frame storage module of the transmission path.

Figure 3:
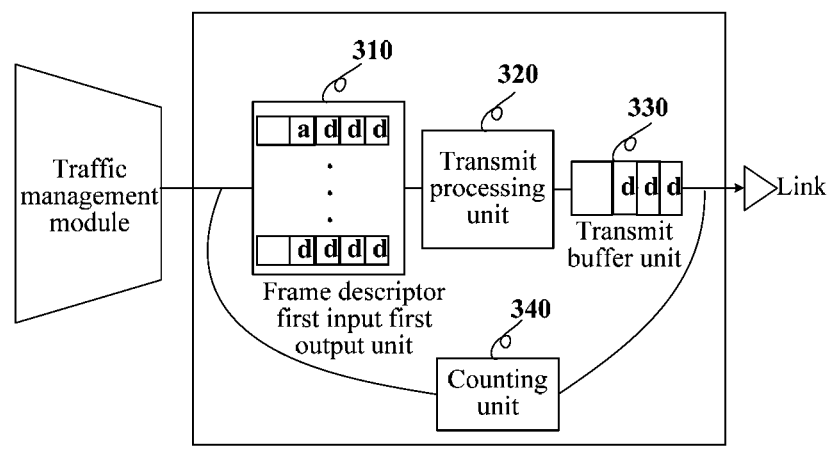
FIG. 3 is a schematic structural diagram of a data transmit apparatus according to another embodiment of the present invention.

The embodiments of the present invention are further described below with reference to an actual hardware structure of a transmission path. Referring to FIG. 3, a transmission path provided by an embodiment of the present invention specifically includes:

a frame descriptor first input first output unit 310, configured to receive and store an FD, sent by the TM module, of the first frame, and obtain a length value of the first frame according to the FD;

the transmit processing unit 320, configured to extract the FD of the first frame from the frame descriptor first input first output unit 310, obtain through parsing a start storage address, in a memory, of the first frame, obtain the first frame from the memory according to the start storage address of the first frame and the length value of the first frame, and write the first frame into a transmit buffer unit 330;

the transmit buffer unit 330, configured to send the first frame to a link; and a counting unit (BYTE_COUNTER) 340, configured to: add a recorded volume of data stored in the transmission path to the length value of the first frame obtained from the frame descriptor first input first output unit 310, and each time when it is detected that the transmit buffer unit 330 sends data in a packet to the link once, subtract a volume of the data sent by the transmit buffer unit 330 from the recorded volume of the data stored in the transmission path; determine whether the recorded volume of the data stored in the transmission path is greater than a preset data volume threshold; and send a backpressure signal to the TM module when the recorded volume of the data stored in the transmission path is greater than the preset data volume threshold, to instruct the TM module to stop sending an FD.

A volume of data sent by the transmit buffer unit 330 to the link each time may be a preset fixed value, which generally is 2 bytes or 16 bytes. Therefore, each time when detecting that the transmit buffer unit 330 sends data to the link once, the counting unit directly subtracts the preset fixed value from a currently recorded data volume of data to be sent, so as to update the volume of the data stored in the transmission path and avoid detection on the volume of the data sent by the transmit buffer unit 330 to the link.

It is assumed that a storage depth (a maximum quantity of FDs and frames that can be stored) of an entire transmission path is TXBUF_DEPTH packets, a maximum length of packet data is MTU, a maximum value of the volume BYTE_CONTER of the data stored in the transmission path that can be counted by the counting unit is: $BYTE\_CONTER_{max}$=TXBUF_DEPTH*MTU, and a data volume threshold (BP_TH) configured by the transmission path is $BYTE\_COUNTER_{max}$. When finding that the BYTE_CONTER is greater than the BP_TH, the counting unit outputs the backpressure signal to the upper-level TM module; and when the BYTE_CONTER is not greater than the BP_TH, the backpressure signal for upper-level TM is cancelled, and the TM starts to schedule again a new FD to be sent to the transmission path.

Figure 4:
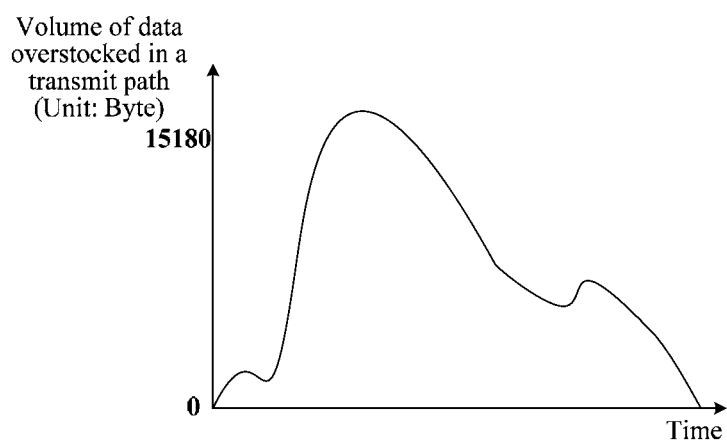
FIG. 4 is a schematic diagram of a volume of data overstocked in a transmission path in the prior art.
Figure 5:
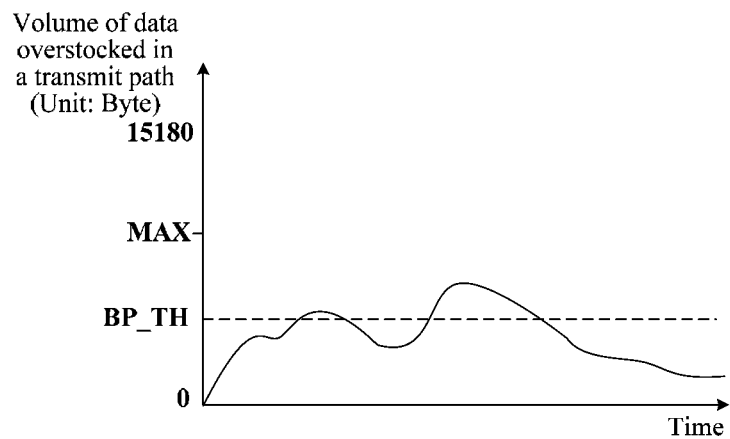
FIG. 5 is a schematic diagram of a volume of data overstocked in a transmission path according to an embodiment of the present invention.

FIG. 4 and FIG. 5 are schematic effect diagrams of a data volume overstocking situation in a transmission path in the prior art and a data volume overstocking situation in a transmission path according to an embodiment of the present invention respectively. In the prior art, the transmission path sends a backpressure signal to TM only when a quantity of stored packets reaches a maximum value, and a quantity of bytes overstocked in the transmission path may be a very large peak value because there are many long packets in a period. In this embodiment of the present invention, a total quantity of bytes in the transmission path may be limited to a certain range.

Further, when a maximum quantity of bytes that can be stored in the transmission path, that is, the volume of the data stored in the transmission path, is just one byte less than the BP_TH, the TM sends an FD having a recorded frame length of MTU to enter the transmission path, that is, the stored maximum quantity of bytes is (BP_TH−1)+MTU, and then maximum blocking latency for a packet that enters the transmission path subsequently may be calculated as:

$Latency_{max}$=[(BP_TH−1)+*MTU]*8 bits/BW, where BW is a bandwidth of the link.

Therefore, blocking latency for a packet can be controlled within a certain range (less than $Latency_{max}$) by setting a value of BP_TH, so as to ensure that no excessively large latency is introduced to the packet due to blocking of a same-level device, thereby improving transmission efficiency and performance of a TCP application, and improving quality of service (Quality of Service, QoS).

An effect of this embodiment of the present invention is further described below with reference to specific data.

It is assumed that the storage depth of the transmission path is 10 packets, the bandwidth of the link is 2 Mbps, and FTP downloading and uploading services are performed at the same time.

Figure 1:
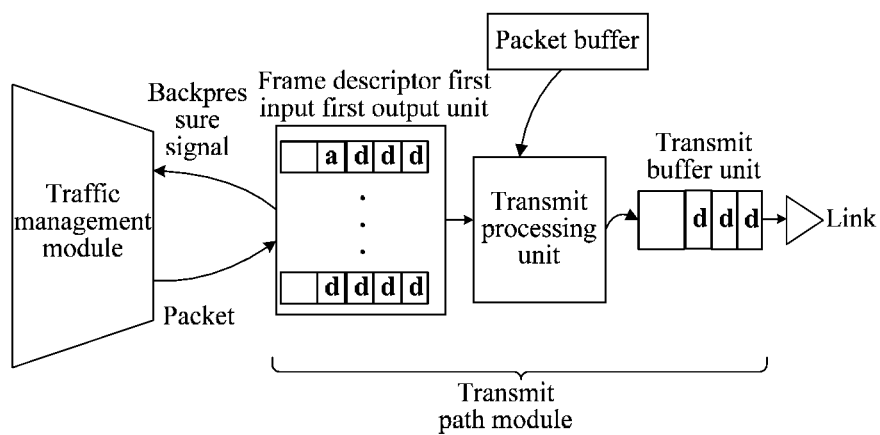
FIG. 1 is a schematic structural diagram of a data transmit apparatus in the prior art.

Assuming that a frame length of an ACK frame of an FTP service and a frame length of an uploaded data packet are both 1518 bytes, and the apparatus shown in FIG. 1 is used, when a quantity of packets stored in the transmission path reaches 10, a backpressure signal is output to the TM; in this case, blocking latency for an ACK packet that enters the TM subsequently is:

$Latency_{max}$=[1518*(10+1)]*8/2 Mbps≈67 ms.

If the apparatus shown in FIG. 3 is used and the BP_TH is set to 1000 bytes, based on the foregoing analysis, a worst case is that a stored quantity of bytes in the transmission path is (BP_TH−1)+MTU, and maximum latency is:

$Latency_{max}$=[1000−1+1518]*8/2 Mbps≈10 ms.

Therefore, in a case in which there are many long packets at a head of an ACK frame queue, blocking latency for an ACK frame can be significantly reduced in this embodiment of the present invention.

Assuming that a frame length of an ACK frame responded by a download service and a frame length of an uploaded data packet are both 64 bytes, and the apparatus shown in FIG. 1 is used, when a quantity of packets stored in the transmission path reaches 10, a backpressure signal is output to the TM; in this case, blocking latency for an ACK packet that enters the TM subsequently is:

$Latency_{max}$=[64*(10+1)]*8/2 Mbps≈3 ms.

If the apparatus shown in FIG. 3 is used, and the BP_TH is set to 1000 bytes, based on the foregoing analysis, a calculation unit sends the backpressure signal to the TM module when the stored quantity of bytes in the transmission path is (BP_TH−1)+MTU. However, considering that two kinds of backpressure mechanisms are generally used at the same time in actual use, that is, when the quantity of FDs is greater than the preset quantity threshold, the FD_FIFO sends the backpressure signal to the TM module, and when the volume of the data stored in the transmission path exceeds the BP_TH, a counter sends the backpressure signal to the TM module. Because packet data of 1000 bytes is corresponding to 1000 bytes/64 bytes≈15 short packets, and the FD_FIFO has sent the backpressure signal when the quantity of FDs reaches 10, a quantity of bytes buffered in the transmission path cannot reach (BP_TH−1)+MTU, and the maximum latency is still:

$Latency_{max}$=[64*(10+1)]*8/2 Mbps≈3 ms.

By using such two kinds of backpressure mechanisms at the same time, burstiness for short packets can be ensured and it can also be ensured that no excessively large blocking latency is introduced to the transmission path.

Figure 6:
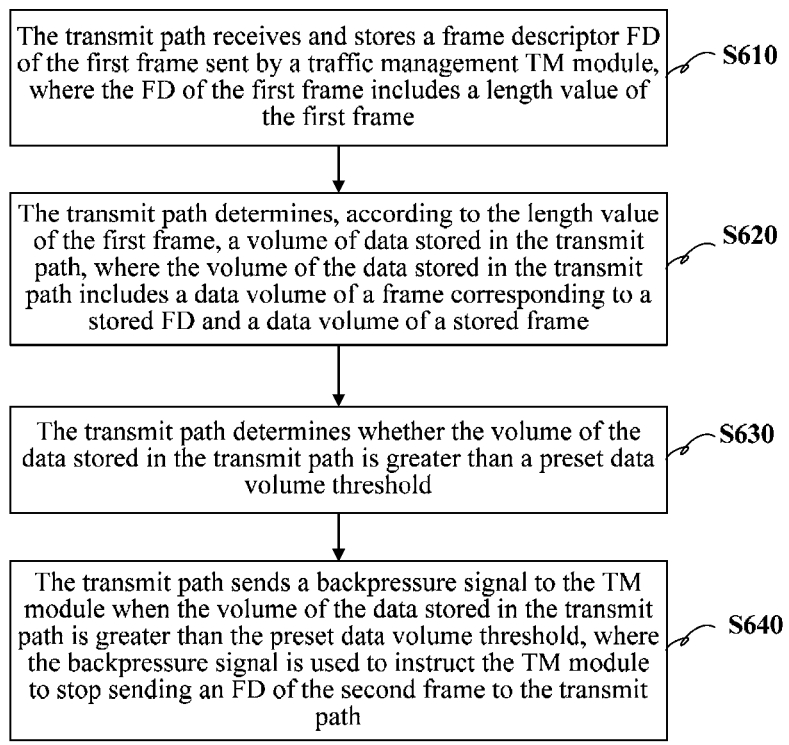
FIG. 6 is a schematic flowchart of a data processing method for a transmission path according to an embodiment of the present invention.

Referring to FIG. 6, a data processing method for a transmission path provided by an embodiment of the present invention includes:

S610: The transmission path receives and stores a frame descriptor FD, sent by a traffic management TM module, of the first frame, where the FD of the first frame includes a length value of the first frame.

S620: The transmission path determines, according to the length value of the first frame, a volume of data stored in the transmission path, where the volume of the data stored in the transmission path includes a data volume of a frame corresponding to a stored FD and a data volume of a stored frame.

S630: The transmission path determines whether the volume of the data stored in the transmission path is greater than a preset data volume threshold.

S640: When the volume of the data stored in the transmission path is greater than the preset data volume threshold, the transmission path sends a backpressure signal to the TM module, where the backpressure signal is used to instruct the TM module to stop sending an FD of the second frame to the transmission path.

Specifically, the step S620 includes:

determining, by the transmission path, the sum of a volume of data stored before the FD of the first frame is stored and the length value of the first frame, as the volume of the data stored in the transmission path.

Optionally, the method further includes:

sending, by the transmission path, first data to a link, where the first data is data of a frame stored in the transmission path; and subtracting, by the transmission path, a data volume of the first data from the volume of the data stored in the transmission path, so as to update the volume of the data stored in the transmission path.

Optionally, the method further includes:

determining, by the transmission path, a quantity of FDs stored in the transmission path; and sending, by the transmission path, the backpressure signal to the TM module when it is determined that the quantity of the stored FDs reaches a preset quantity threshold.

Optionally, the FD of the first frame further includes a start storage address, in a memory, of the first frame, and the method further includes:

obtaining, by the transmission path, the first frame from the memory according to the length value of the first frame and the start storage address of the first frame, and storing the first frame.

In conclusion, the embodiments of the present invention provide a transmission path and a data processing method for a transmission path. By controlling a data volume of to-be-sent packets overstocked in the transmission path, blocking latency for a packet that newly enters the transmission path is controlled, and transmit latency for the packet is reduced.

A person skilled in the art should understand that the embodiments of the present invention may be provided as a method, a system, or a computer program product. Therefore, the present invention may use a form of a complete hardware embodiment, a complete software embodiment, or an embodiment combining software and hardware. Moreover, the present invention may use a form of a computer program product that is implemented on one or more computer-usable storage mediums (including but not limited to a disk memory, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may also be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to the present invention without departing from the spirit and scope of the present invention. In this way, the present invention is intended to cover these modifications and variations provided that these modifications and variations to the present invention fall within the scope of the claims of the present invention and their equivalent technologies.

What is claimed is:

1. A data processing method for a transmission path, comprising:

receiving and storing, by the transmission path, a frame descriptor (FD), sent by a traffic management (TM) module, of a first frame, wherein the FD of the first frame comprises a length value of the first frame;

determining, by the transmission path, according to the length value of the first frame, a volume of data stored in the transmission path, wherein the volume of the data stored in the transmission path is determined as a sum of a) the length value of the first frame, and b) a volume of data stored before the FD of the first frame is stored, wherein the volume of data stored before the FD of the first frame comprises a data volume of a frame corresponding to a stored FD and a data volume of a stored frame;

determining, by the transmission path, whether the volume of the data stored in the transmission path is greater than a preset data volume threshold; and sending, by the transmission path, a backpressure signal to the TM module when the volume of the data stored in the transmission path is greater than the preset data volume threshold, wherein the backpressure signal is used to instruct the TM module to stop sending an FD of a second frame to the transmission path.

2. The method according to claim 1, further comprising:

sending, by the transmission path, first data to a link, wherein the first data is data of a frame stored in the transmission path; and subtracting, by the transmission path, a data volume of the first data from the volume of the data stored in the transmission path, so as to update the volume of the data stored in the transmission path.

3. The method according to claim 1, further comprising:

determining, by the transmission path, a quantity of FDs stored in the transmission path; and sending, by the transmission path, the backpressure signal to the TM module when it is determined that the quantity of the stored FDs reaches a preset quantity threshold.

4. The method according to claim 1, wherein the FD of the first frame further comprises a start storage address of the first frame stored in a memory, and the method further comprises:

obtaining, by the transmission path, the first frame from the memory according to the length value of the first frame and the start storage address of the first frame; and storing the first frame in the memory.

5. A transmission path, comprising a processor and a non-transitory processor-readable medium having processor-executable instructions stored thereon, the processor-executable instructions including a plurality of modules, the modules including:

a frame descriptor (FD) storage module, configured to receive and store a frame descriptor FD, sent by a traffic management (TM) module, a the first frame, wherein the FD of the first frame comprises a length value of the first frame;

a calculating module, configured to determine, according to the length value of the first frame stored in the FD storage module, a volume of data stored in the transmission path, wherein the volume of the data stored in the transmission path comprises a data volume of a frame corresponding to a stored FD and a data volume of a stored frame;

a determining module, configured to determine whether the volume of the data stored in the transmission path is greater than a preset data volume threshold; and an instructing module, configured to send a backpressure signal to the TM module when the volume of the data stored in the transmission path is greater than the preset data volume threshold, wherein the backpressure signal is used to instruct the TM module to stop sending an FD of a second frame to the transmission path.

6. The transmission path according to claim 5:
further comprising a sending module, configured to send first data to a link, wherein the first data is data of a frame stored in the transmission path; and wherein the calculating module is further configured to subtract a data volume of the first data from the volume of the data stored in the transmission path, for updating the volume of the data stored in the transmission path.

7. The transmission path according to claim 5, wherein:

the calculating module is further configured to determine a quantity of FDs stored in the FD storage module;

the determining module is further configured to determine whether the quantity of FDs stored in the FD storage module reaches a preset quantity threshold; and the instructing module sends the backpressure signal to the TM module when the quantity of FDs stored in the FD storage module reaches the preset quantity threshold.

8. The transmission path according to claim 5, wherein:

the FD of the first frame further comprises a start storage address of the first frame stored in a memory; and the transmission path further comprises a frame storage module, configured to obtain the first frame from the memory according to the length value of the first frame stored in the FD storage module and the start storage address of the first frame, and store the first frame in the memory.

* * * * *